(12) United States Patent
Heibel (10) Patent No.: US 12,476,017 B2
(45) Date of Patent: Nov. 18, 2025

(54) MODULAR RADIOISOTOPE PRODUCTION CAPSULES AND RELATED METHOD

(71) Applicant: Westinghouse Electric Company LLC, Cranberry Township, PA (US)

(72) Inventor: Michael D. Heibel, Broomfield, CO (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 521 days.

(21) Appl. No.: 17/768,927

(22) PCT Filed: Oct. 14, 2020

(86) PCT No.: PCT/US2020/055640
§ 371 (c)(1),
(2) Date: Apr. 14, 2022

(87) PCT Pub. No.: WO2021/076673
PCT Pub. Date: Apr. 22, 2021

(65) Prior Publication Data
US 2024/0105354 A1    Mar. 28, 2024

Related U.S. Application Data

(60) Provisional application No. 62/914,661, filed on Oct. 14, 2019.

(51) Int. Cl.
*G21G 1/02* (2006.01)
*G21C 23/00* (2006.01)
(52) U.S. Cl.
CPC .............. *G21G 1/02* (2013.01); *G21C 23/00* (2013.01)

(58) Field of Classification Search
CPC .................................. G21G 1/02; G21C 23/00
See application file for complete search history.

(56) References Cited

U.S. PATENT DOCUMENTS 3,396,077 A * 8/1968 Bodnarescu ............. G21G 1/08
376/202
8,873,694 B2 10/2014 Stucker
(Continued)

FOREIGN PATENT DOCUMENTS

EP 2599087 A1 6/2013
EP 2625696 A1 8/2013
(Continued)

OTHER PUBLICATIONS

International Search Report and Written Opinion for International PCT Application No. PCT/US2020/055640, dated Jan. 28, 2021.

*Primary Examiner* — Sharon M Davis
(74) *Attorney, Agent, or Firm* — K&L Gates LLP (57) ABSTRACT

A radioisotope production capsule is described. Each capsule includes generally an inner container for housing one of a target material and a neutron moderator, an outer container surrounding the inner container for housing the one of the target material and the neutron moderator not housed by the inner container, and cladding for isolating the target material from the neutron moderator. One or more modular capsules are placed in each of a plurality of plug fingers. Each single plug finger loaded with one or more capsules is inserted into a guide thimble of an array of guide thimbles in a fuel assembly.

14 Claims, 7 Drawing Sheets

(56) References Cited

U.S. PATENT DOCUMENTS

| | | | |
|---|---|---|---|
| 9,396,826 B2 | 7/2016 | Reese et al. | |
| 2012/0027152 A1 | 2/2012 | Reese et al. | |
| 2014/0226773 A1* | 8/2014 | Toth | G21G 1/02 |
| | | | 376/158 |
| 2018/0122521 A1* | 5/2018 | Heibel | G21G 1/02 |
| 2020/0075180 A1* | 3/2020 | Onderwater | G21C 23/00 |

FOREIGN PATENT DOCUMENTS

| | | | |
|---|---|---|---|
| FR | 2647945 A1 | 12/1990 | |
| JP | H03-029899 A | 2/1991 | |
| RU | 93175 U1 | 4/2010 | |
| WO | WO-2016161728 A1 * | 10/2016 | G21G 1/02 |
| WO | 2021076673 A1 | 4/2021 | |

* cited by examiner

FIG. 5

MODULAR RADIOISOTOPE PRODUCTION CAPSULES AND RELATED METHOD

CROSS-REFERENCE TO RELATED APPLICATIONS

This application is a U.S. National Stage Entry under 35 U.S.C. § 371 of International Patent Application No. PCT/US2020/055640, entitled MODULAR RADIOISOTOPE PRODUCTION CAPSULES AND RELATED METHOD, filed Oct. 14, 2020, which claims benefit under 35 U.S.C. § 119 (e) to U.S. Provisional Application No. 62/914,661, filed Oct. 14, 2019, entitled MODULAR RADIOISOTOPE PRODUCTION CAPSULES, the entire disclosures of which are hereby incorporated by reference herein.

BACKGROUND

1. Field

The present disclosure relates to radioisotopes, and more particularly to a device for capturing radioisotopes during nuclear power production.

2. Description of the Background

Radioactive isotopes, or radioisotopes, are used commercially in a variety of industries, such as medicine where gamma rays emitted by radioactive elements are used to detect tumors, in the food industry where food is sometimes irradiated by exposure to gamma rays to kill certain bacteria, in agriculture, pest control, and in archeology where radiocarbon dating uses carbon-14 to measure the age of carbon-bearing items. Radioisotopes are highly unstable and readily decay, emitting radiation in the form of alpha, beta and gamma rays. A class of radioisotopes is produced as a by-product of typical nuclear power plant operation.

The production of commercially valuable radioisotopes, such as Co-60, Ac-225, and W-188, requires the capture of at least one neutron by a target material placed inside a reactor core. Cobalt-60 (Co-60), for example, produces high energy gamma rays, which may be used for radiotherapy, equipment sterilization, and food irradiation. Co-60 is a synthetic radioisotope of cobalt that is produced artificially in nuclear reactors. Deliberate industrial production depends on neutron activation of bulk samples of the monoisotopic and mononuclidic cobalt isotope Co-59. Actinium-225 (Ac-225) is produced by the decay of thorium-229. Ac-225 can be used in nuclear medicine for treatment of malignancies. Tungsten-188 (W-188) is produced in a nuclear reactor by irradiation of tungsten oxide with thermal and high energy neutrons. W-188 is used to produce Rhenium-188 (Re-188), a high energy β-emitting radioisotope which has shown utility for a variety of therapeutic applications in nuclear medicine, oncology, radiology, and cardiology.

Figure 1:
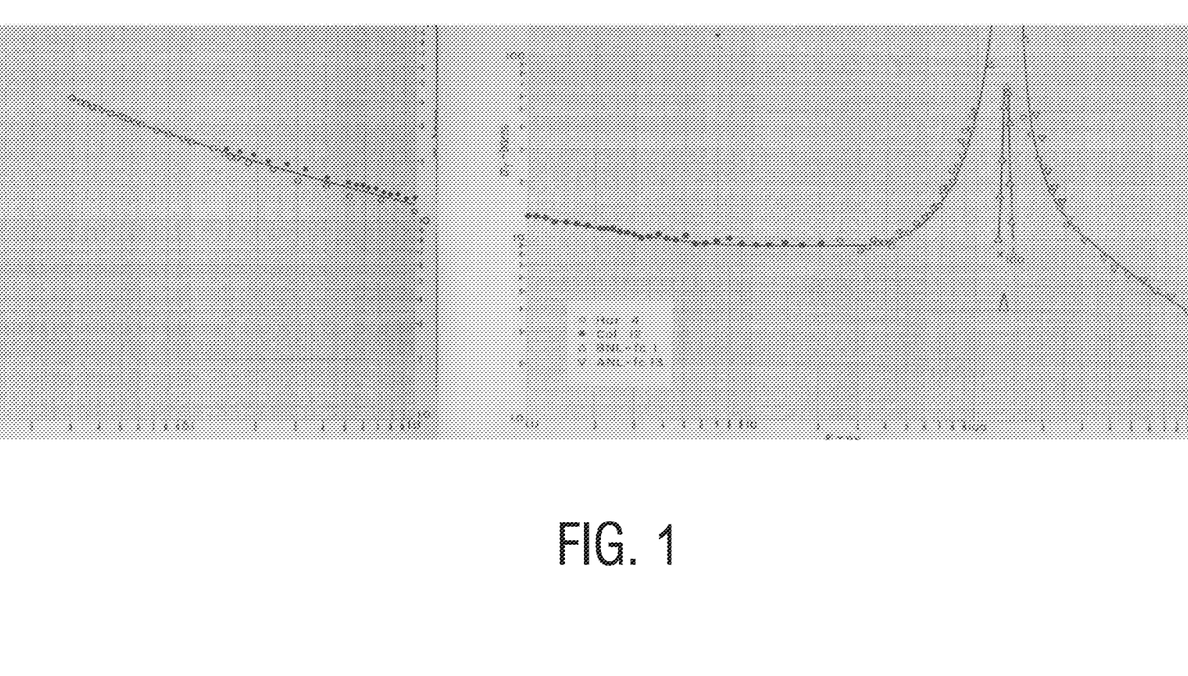
FIG. 1 is an image of a graph of a neutron capture cross section of Co-59 as a function of neutron energy (BNL-325).

The rate of production of the desired radioisotope depends on the numbers and energy spectrum of neutrons surrounding the target material (e.g., Co-59, thorium-229 etc.) and the probability that the target material captures neutrons within the energy range. An example of this phenomena is revealed by the neutron "capture cross section" measurements for Co-59, shown in FIG. 1 as a function of neutron energy. The neutron capture cross section is shown to be about 50 barns (b) at 0.025 eV. The neutron capture cross section increases dramatically at the capture resonance present at a neutron energy of approximately 107 eV where it increases to approximately 7000b. In U-235 fission, the most probable neutron energy is 0.73 MeV. Ideally, the number of neutrons in the 104 eV or below range needs to be maximized in order to maximize the rate at which Co-60 is produced. This can be done by simply increasing the number of fissions that occur. This may be accomplished by increasing the amount of U-235 present in the fuel. However, the economic cost of that approach significantly increases the cost of the radioisotope being produced.

Another method is to increase the amount of 107 eV neutrons surrounding the target material without needing to increase the fission rate. This can be accomplished by surrounding the target material with an optimal amount of neutron energy moderating material with a high neutron lethargy and slowing down more of the neutrons with higher energies that wouldn't normally be captured by the Co-59 target before they diffuse away from the area of the target. This effectively increases the number of fission neutrons that are in the desired energy range to maximize the neutron captures in the target material. Optimizing the amount and distribution of water surrounding the Co-60 target will allow the average neutron energy spectrum around the target to be controlled to maximize the Co-60 production rate. The same approach can be used to increase the production rates of other desired radioisotopes.

One way to accomplish the desired shifting of the fission neutron energy spectrum around an irradiation target is to change the amount of neutron energy moderator, such as water, or other material with a low neutron capture cross section and a high neutron scattering cross section, between the target and the neutrons produced by fission. The hydrogen in a water moderator is very effective at slowing down high energy neutrons, but not capturing them so they can't interact at all with the irradiation target material. Adjusting the amount of water surrounding the irradiation target can be accomplished in a water cooled and moderated reactor core by controlling the geometry of the irradiation target. Materials other than water, such as low atomic number metallic substances with small neutron capture cross sections (e. g. Zirconium, Nickle, Graphite) may also be used to increase the neutron captures in the target material.

It has been shown by calculations performed by those skilled in the art that the use of pressurized water reactor (PWR) fuel assembly inserts similar to thimble flow plugs or burnable absorber rods containing rod-shaped slugs of Co-59 for the production of Co-60 can be used to produce commercially valuable amounts of Co-60. However, the predicted specific activity (SA) in $Ci/cm^3$ and the Ci per unit length of the current irradiation target shape of the Co-60 in the irradiated material at the end of the desired irradiation period is less than needed to support economically favorable production useful for current application practices.

SUMMARY OF THE INVENTION

The following summary is provided to facilitate an understanding of some of the innovative features unique to the embodiments disclosed and is not intended to be a full description. A full appreciation of the various aspects of the embodiments can be gained by taking the entire specification, claims, abstract and drawings as a whole.

Described herein are devices and methods to generate the maximum amount of desired radioisotope from irradiation targets designed to fit into the guide thimbles present in conventional reactors, such as PWR fuel assemblies, with the intent to benefit the radioisotope production economics.

A radioisotope production capsule used for this purpose may include an inner container for housing one of a target material and a neutron moderator, an outer container surrounding the inner container for housing the one of the target material and the neutron moderator not housed by the inner container, and cladding for isolating the target material from the neutron moderator. The neutron moderator, in various aspects, may be a coolant such as water.

In various aspects, the inner container is defined by an inner wall of a cladding material. In various aspects, the outer container is defined between an outer wall of the cladding material and the inner wall of the cladding material. The capsule may also include locking members for axially joining adjacent capsules within an insert component of a fuel assembly of a nuclear reactor. The locking members may in various aspects be mounted on the outer container. In certain aspects, the locking members may be quick-disconnect locking members.

The capsule may also include support members for holding the inner container in a desired position within the outer container. The support members may be posts that extend from an outer wall of the cladding material that forms the outer container to an inner wall of a cladding material that defines the inner container. The posts are preferably made of a material that expands at temperatures within a nuclear reactor to provide a pressure fit for the posts between the outer wall of the outer container and the inner wall of the inner container and contracts when the material is cooled to a temperature lower than the temperatures within a nuclear reactor.

The inner container is in various aspects a cylinder and the outer container is an annular cylinder concentric with the axis of the inner container. In certain aspects, the inner cylinder holds the neutron moderator and the annular cylinder holds the target material for irradiation. In certain aspects, the inner cylinder holds the target material for irradiation and the annular cylinder holds the neutron moderator.

A method for producing a desired radioisotope is described herein. The method includes providing at least one capsule, each capsule having an inner container and an outer container surrounding the inner container, and a cladding material isolating the inner container from the outer container, inserting a target material that will produce the desired radioisotope upon irradiation into one of the inner or the outer container, surrounding the target material with the cladding material to isolate the target material within the capsule, inserting a neutron moderator into the one of the remaining inner or outer container in which the target material was not inserted, inserting at least one capsule having target material and neutron moderator-filled inner and outer containers into an insert component of a nuclear fuel assembly, irradiating the target material to form the radioisotope from such target material, and removing the capsule from the insert component.

The modular radioisotope production capsules described herein allow the neutron energy spectrum to be optimized for the target capture cross section and the minimum reactor fuel assembly reactivity reduction with the capability to adjust the total activity contained in a module outer envelope.

BRIEF DESCRIPTION OF THE DRAWINGS

The characteristics and advantages of the present disclosure may be better understood by reference to the accompanying figures.

FIGS. 3A and B are schematic top section and side section views, respectively, of an exemplary modular radioisotope production capsules having an outer annular target material placement.

FIGS. 4A and B are schematic top section and side section views, respectively, of an exemplary modular radioisotope production capsules having a centrally placed target material.

DESCRIPTION OF THE PREFERRED EMBODIMENTS

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Figure 2A:
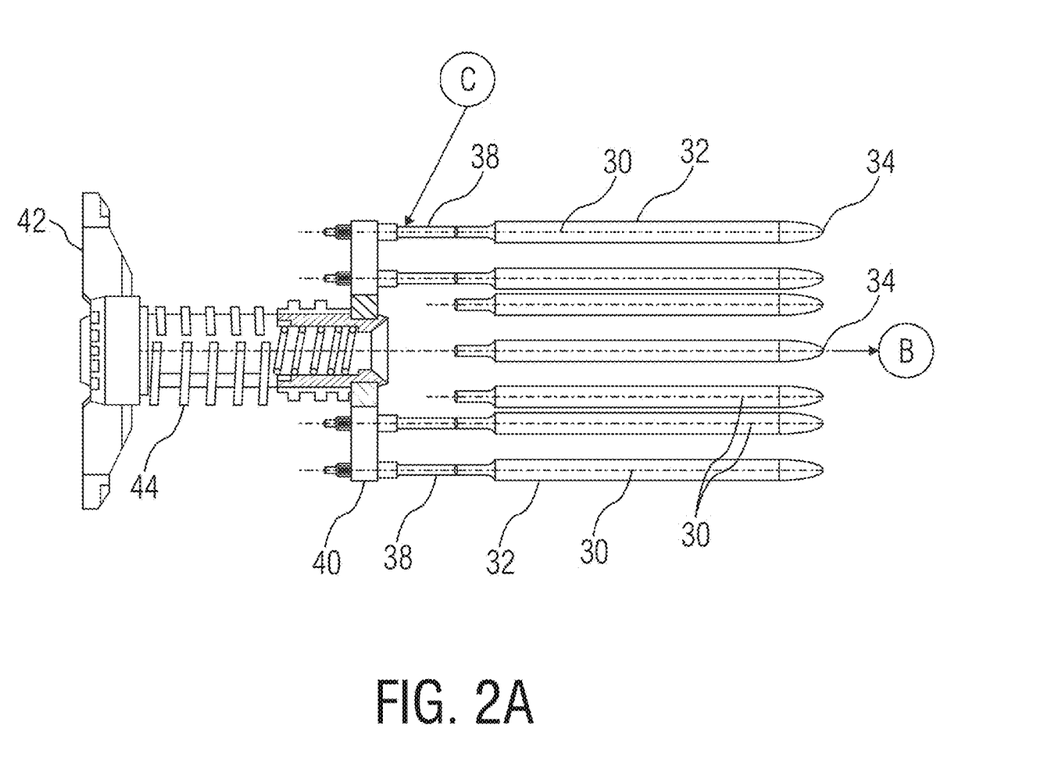
FIGS. 2A-C illustrate an exemplary group of guide thimbles (A), a top section schematic view of the guide thimbles as they are positioned within a fuel assembly (B), and (C) a schematic illustration of a thimble plug finger and radioisotope production capsule for insertion in a guide thimble.
Figure 2B:
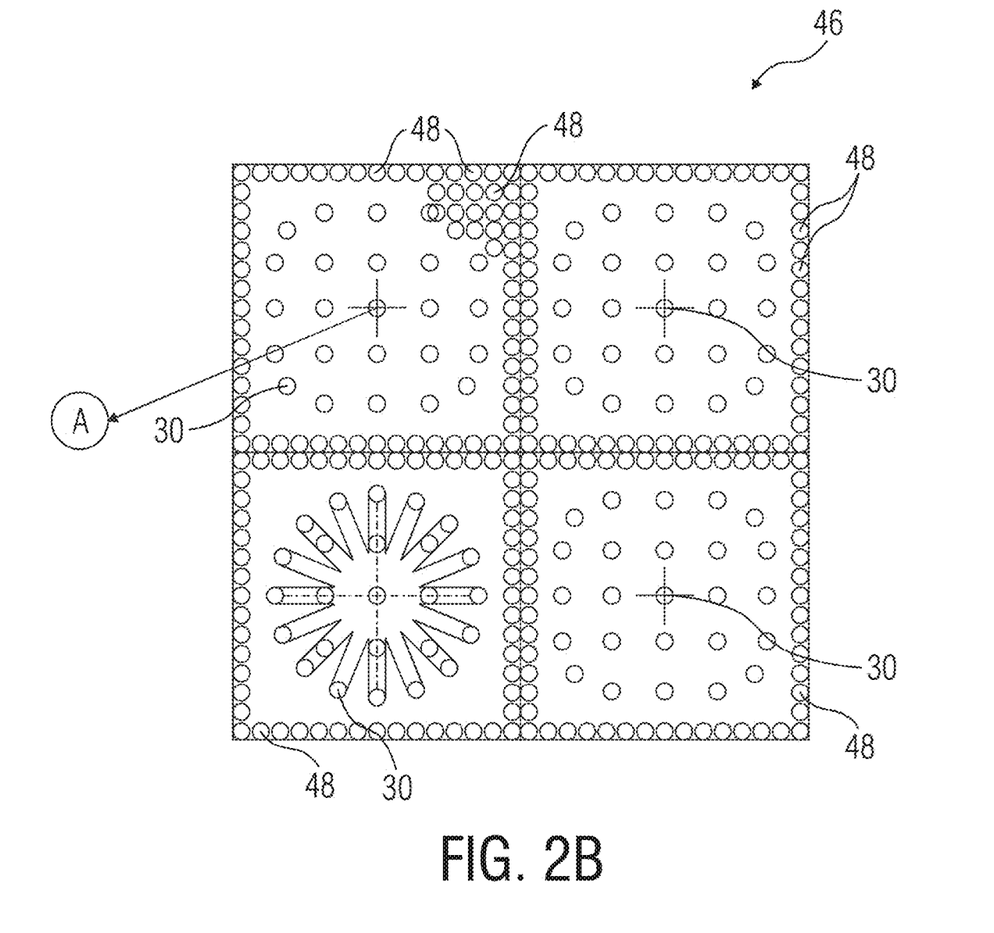

Referring to FIGS. 2 A and B, a nuclear fuel assembly 46 commonly includes a plurality of fuel rods 48 (only a few rods are shown around the perimeter for clarity, but in use, the rods would occupy most of the fuel assembly space), and a set of guide thimble tubes 30. Guide thimbles 30 are vacant tubes provided to hold control rods or in-core instrumentation used in a reactor (not shown). Each guide thimble 30, as shown, includes a neck 38, a mid-section 32 and a tapered end 34. Several guide thimbles 30 are suspended from a plate 40, which is itself suspended by a hold down spring 44 from the upper core plate 42 of the fuel assembly 46. In the illustration shown in FIG. 2 B, there are 25 guide thimbles 30 in each fuel assembly 46. The number may vary depending on factors such as the size of the reactor.

Figure 2C:
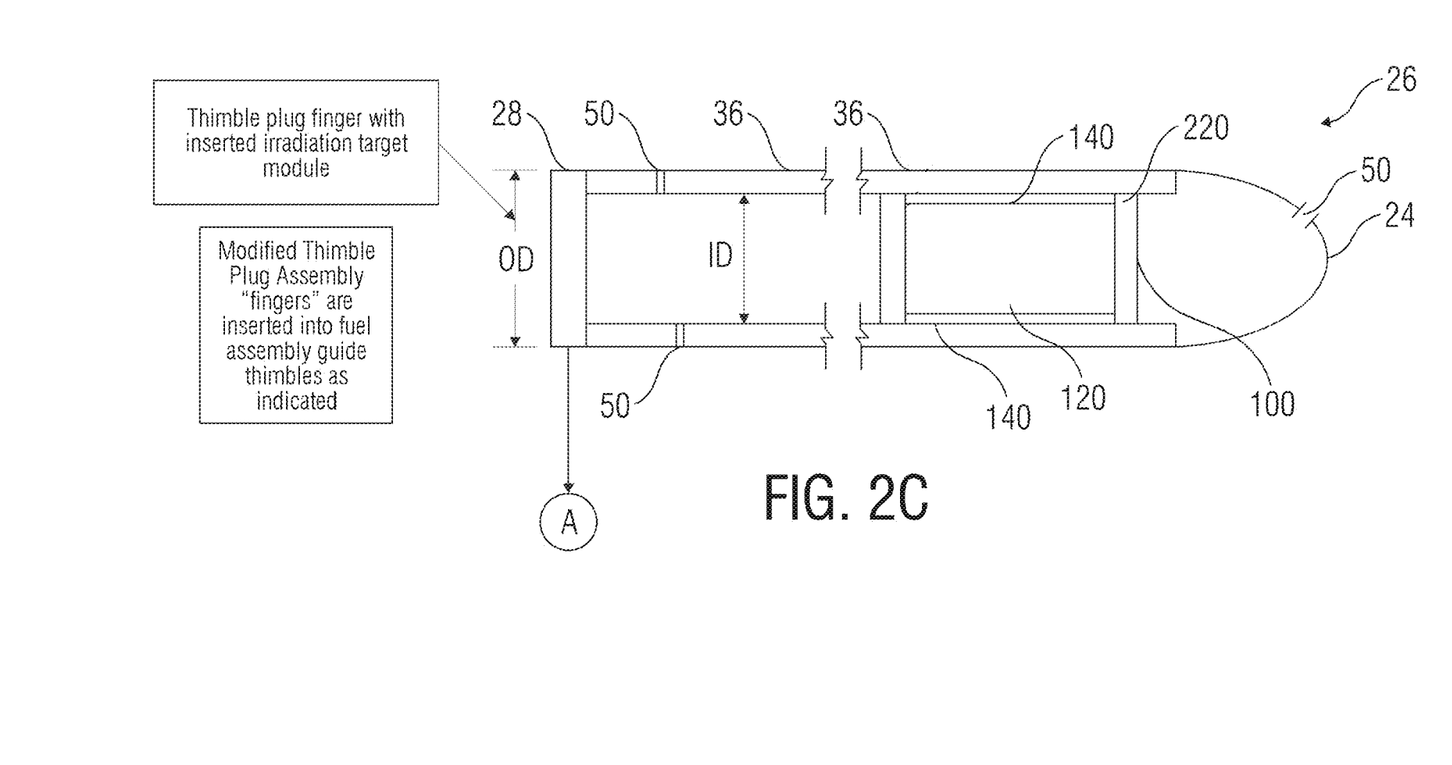

FIG. 2 C illustrates a section view of an exemplary thimble plug finger 26 dimensioned to fit within a guide thimble 30. The plug finger 26 includes an outer sheath 36, a cap 28 for closing the open end of finger 26, and a tapered closed end 24. The plug fingers 26 are meant to fit in the interior of the guide thimbles 30, so the outer dimensions of the fingers 26 will be equal to or less than the inner diameter of the guide thimble mid-section 30. Either the juncture between the mid-section 32 and the tip 34 or the mid-section 32 and the neck 38 may be opened for insertion of the plug fingers 26.

An exemplary radioisotope production capsule 100 (see FIG. 4) is shown positioned within the plug finger 26. If there were no plug fingers 26 inserted into the fuel assembly guide thimbles 30 during reactor operation, the guide thimble tubes would be filled with the neutron moderator and coolant used in a PWR, such as water, with a flow rate that exceeds the neutron moderator and coolant flow through the fuel rods 48 included in the fuel assembly 46. The plug fingers 26 block this flow and consequently increase the neutron moderator and coolant flow among the fuel rods 48. Including the irradiation target material inside the plug fingers 26 allows the plug fingers 26 to both serve their intended function and to produce the desired radioisotopes.

While those skilled in the art will appreciate that a variety of different geometries for the plug fingers 26 and radioisotope production capsules 10, 100 may be used, using the same geometry as the conventional fuel assembly guide thimbles 30 avoids the need to make any modifications to the fuel assembly mechanical design. This approach greatly reduces the costs associated with implementing the radioisotope production in commercial light water reactors (LWR) designs.

Figure 3:
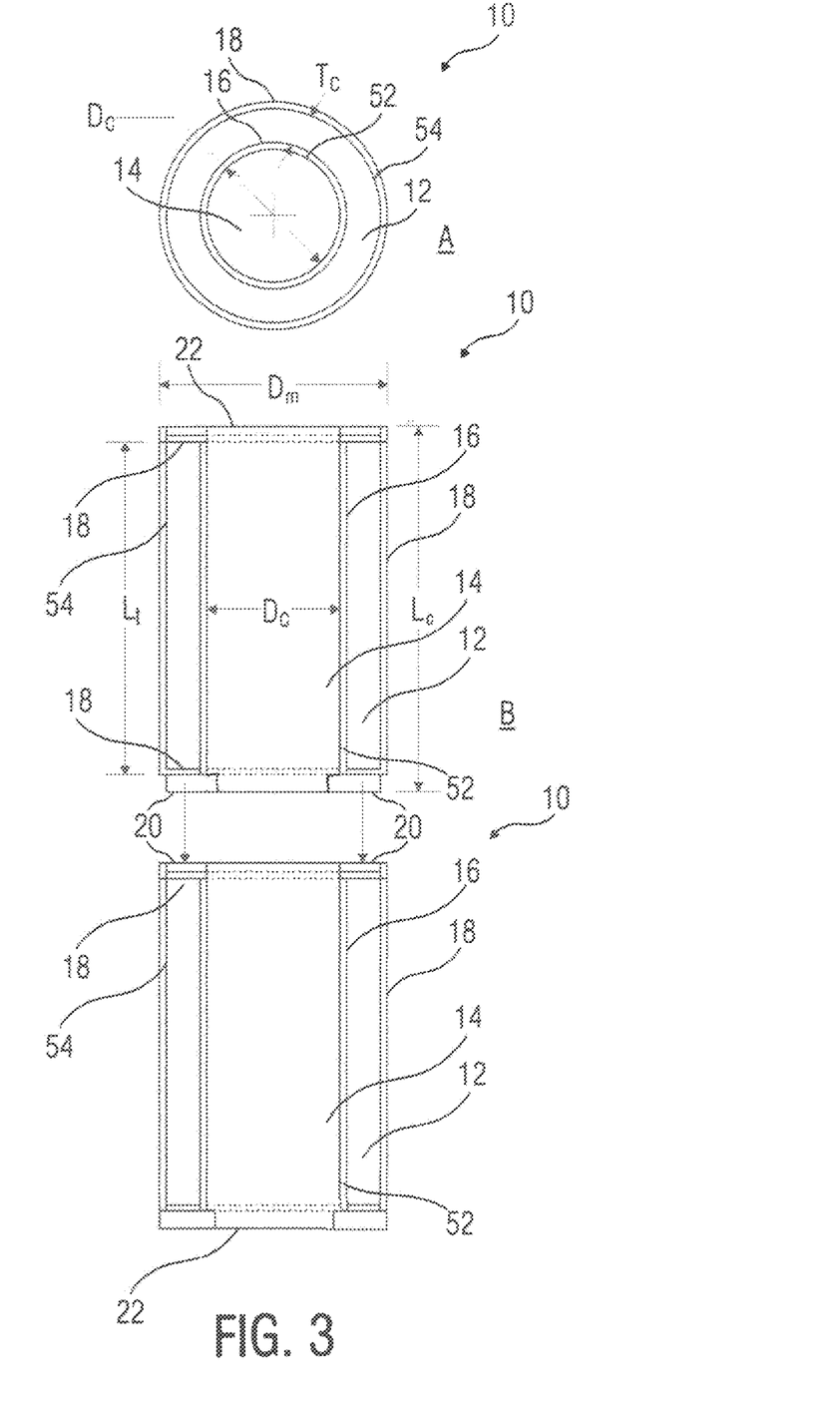

FIGS. 3 A and B illustrate an exemplary embodiment of modular radioisotope capsules 10 for insertion in a plug finger 26. Each capsule 10 shown includes an inner container, such as inner cylinder 52 defined by inner cladding 16. The inner cylinder in this embodiment houses the neutron moderator 14 and coolant, which in various aspects, is water. Surrounding the inner cylinder 52 is an outer container, such as outer annular cylinder 54 defined between the inner cladding 16 and an outer cladding 18. In various aspects, the inner cylinder 52 is positioned such that its axis is concentric with the axis of the outer annular cylinder 54. The annular cylinder 54 in this embodiment holds the target material 12 to be irradiated during the nuclear power generation cycle. The target material 12 will vary depending on the desired radioisotope to be produced, and the appropriate target material for production of the desired radioisotope can be selected. The target material 12 may be in any suitable form, including, but not limited to a solid block, a powder, pellets, spheres, or a liquid. The top and bottom ends of the inner container in this embodiment that holds the neutron moderator and coolant are open to the plug finger interior as indicated by in FIG. 3 by open ends 22. The top and bottom ends of the outer container that holds the target material is closed by top and bottom extensions of outer cladding 18 to isolate the target material from the neutron moderator and coolant. In various aspects, two or more modular capsules 10 may be stacked axially within a plug finger 26 and may be connected to each other by locking rings or pegs 20 or a similar mechanism for joining adjacent capsules 10.

Figure 4:
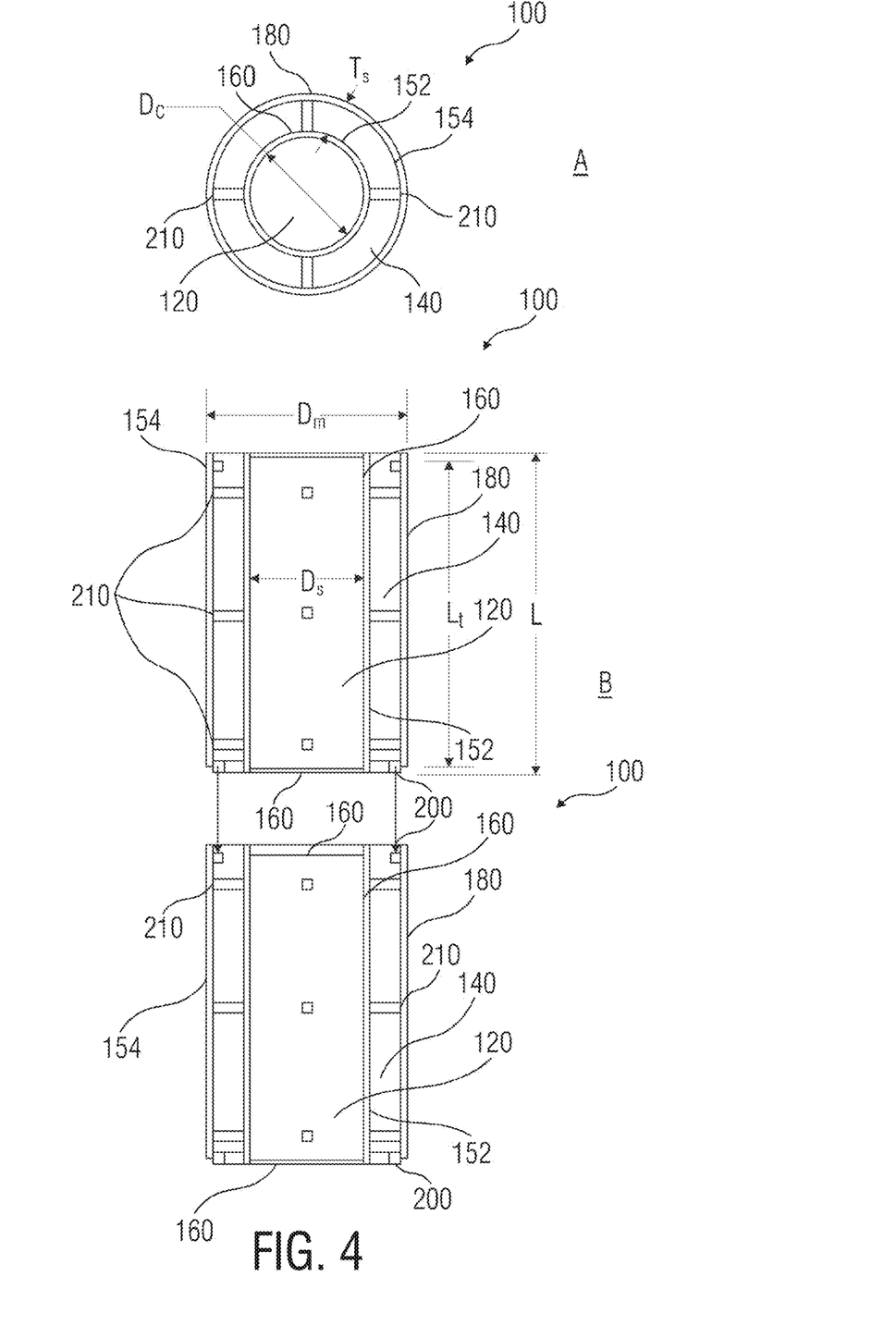

FIGS. 4 A and B illustrate an alternative embodiment of a radioisotope production capsule 100. Capsule 100 includes an inner container, such as inner cylinder 152 that holds target material 120 and an outer container, such as outer annular cylinder 154 that holds neutron moderator 140 and coolant in a PWR. Inner cladding 160 surrounds the top, bottom and sides of the target material and separates the inner cylinder from the annular cylinder. Outer cladding 180 surrounds the sides of the annular cylinder. If the irradiated target material is a solid, the cladding may simply be deposited on the target material. If the target material is a powder, pellet, sphere, or liquid, the cladding forms the walls of the container for the target material to isolate the target material from the neutron moderator and coolant.

Support members 210 support the inner cylinder 152 in position within the annular cylinder 154. The support members may be any suitable device for either or both centering and rigidly mechanically supporting, the inner cylinder 152 within the annular cylinder 154. For example, the support members 210 may be fingers or post-like structures that extend radially outwardly from the inner cladding 160 or which extend radially inwardly from the outer cladding 180 to connect with an engagement surface on the opposite cladding surface. Alternatively, the support members 210 may be made of a material that undergoes thermal expansion under the temperatures typical of a nuclear reactor to create a pressure fit, but which shrink enough as the surrounding temperature cools to allow the inner cylinder 152 to be removed from the annular cylinder 154.

In various aspects, two or more modular capsules 100 may be stacked axially within a plug finger 26 and may be connected to each other by locking rings or pegs 200 or a similar mechanism for joining adjacent capsules 100.

The capsule 10 or 100 design described herein for production of a radioisotope, such as Co-60, maximizes gamma radiation emission intensity by maximizing the conversion rate. The neutron moderator coolant which can be water, for example, in inner cylinder 52 or annular cylinder 154 enters and exits the plug finger 26 outer sheath 36 through small holes 50 that penetrate the finger 26 outer sheath 36 and tip 24 at the top and bottom, respectively, of the plug fingers 26. (See FIG. 2 C.) As described above, the portions of the capsules 10/100 that contain the moderator and coolant are not capped so the top and bottom of the capsules in this portion are open to the liquid moderator and coolant environment inside the PWR thimble plug fingers 26.

The claddings 16 and 18, and claddings 160 and 180, are made of a material that prevents the target material 12/120, such as Co-60, from leaching out of the cylinder holding the target material into the cylinder that holds the neutron moderator.

The most appropriate material will depend on the target material and the desired radioisotope to be produced. Exemplary materials for Co-60 include Ni and Zr. Exemplary materials for Ac-225 and W-188 include Zr and stainless steel. The material for the cladding will depend on factors such as the corrosion resistance of the target material relative to the irradiation of the target material and the need to avoid chemical reactions that would cause perforations in the cladding.

The ratio of the thickness of the annular cylinder 54/154 to the diameter of the inner cylinder 52/152 can be adjusted using commercially available nuclear design tools, such as software packages utilizing advanced nodal code (ANC™) for reactor core analysis or similar packages sold under the mark PALADIN®, which are understood by those skilled in the art to calculate the dimensions needed to maximize the rate of production of the desired radioisotope.

The maximum value of the outer diameter of the capsule 10 or 100, indicated in FIGS. 3 and 4 as Dm, is equal to the inner diameter (ID) of the plug finger 26, shown in FIG. 2 C. An example of the ID of the plug finger 26 is 6.1 mm. The length of the irradiation target material 12/120 contained in the capsule 10/100 is shown on FIGS. 3 and 4 as the dimension Lt. This length is determined by the needs of the end-user of the radioisotope. For example, the irradiation activity of a selected radioisotope needed for a particular application may be calculated per unit length of the target material in the capsule 10/100. For reasons explained in more detail below, the ideal diameter (Ds) of the inner cylinder 152, or the target material 120 held within the inner cylinder 152 as shown in FIG. 4, is less than or equal to the diameter (Dc) of the inner cylinder 52, as shown in FIG. 3.

One or more capsules 10 and 100 may be loaded in tandem into the interior of a plug finger 26. FIGS. 3 and 4 show exemplary modular capsules 10 and 100, respectively, which may be spaced from each other, or which may be stacked one on top of the other, in the interior cavity of a plug finger 26. In various aspects, means to mechanically join the adjacent capsule modules 10 or adjacent capsule modules 100 together, such as locking rings 20 or 200, may optionally be provided, for example, to minimize the potential for mechanical vibration of the modules from causing failures of the outer sheath of the plug fingers. An example of the type of connection method is use of a quarter turn quick disconnect design. Numerous examples of quick-disconnect designs are known in the art. The modules 10 or 100 can be joined until the total length and total activity meets the end user needs.

The connected or stacked modules can be spaced from each other and separated within the fingers 26 to allow the module capsules 10 or 100 that are harvested after irradiation to properly fit inside shipping containers used to transport the irradiated material from the production reactor to a final processing facility. Any suitable means can be used to separate the modular capsules from each other, such as the support members 210 that hold the capsules from the sides, mounts on the outer container rims or on the joining mechanisms 20/200 (e.g., the quick disconnect member on the rim) to separate adjacent modules axially within a plug finger 26, or a similar mechanical attachments known to those skilled in the art. A suitable design of the attachment or suspension supports will allow the capsules 10/100 and target material 12/120 to be easily withdrawn at low temperatures to facilitate removal of the target material from the capsules 10/100 in an irradiated material processing facility.

In practice, one or more capsule 10 modules would be placed in each of a plurality of plug fingers 26. Each single plug finger 26 loaded with one or more capsules 10 would be inserted into the mid-section 32 of a guide thimble 30. Each of the individual guide thimbles 30 in an array of guide thimbles, as shown in FIG. 2 B, may receive a plug fingers 26 which itself has been loaded with one or more capsules 10. In various aspects, only one or a few of the guide thimbles 30 in an array of guide thimble need be used to house the plug fingers 26 and capsules 10. Thus, a large number of capsules 10 may be inserted, via multiple plug fingers 26, into one or multiple guide thimbles 30 and exposed to the radiation within a nuclear reactor to produce the desired radioisotope.

Alternatively, one or more capsule 100 modules would be placed in each of a plurality of plug finger 26. Each single plug finger 26 loaded with one or more capsules 100 would be inserted into the mid-section 32 of a guide thimble 30. Each of the individual guide thimbles 30 in an array of guide thimbles, as shown in FIG. 2 B, may receive a plug fingers 26 which itself has been loaded with one or more capsules 100. In various aspects, only one or a few of the guide thimbles 30 in an array of guide thimble need be used to house the plug fingers 26 and capsules 100. Thus, a large number of capsules 100 may be inserted, via multiple plug fingers 26, into one or multiple guide thimbles 30 and exposed to the radiation within a nuclear reactor to produce the desired radioisotope.

In a third alternative approach, one or more capsule 10 modules would be placed in one or more single plug finger 26 and one or more capsule 100 modules would be placed in one or more different single plug finger 26. The plug finger 26 loaded with one or more capsules 10 and the plug finger 26 loaded with one or more capsules 100 would be inserted into the mid-sections 32 of different guide thimbles 30. Each of the individual guide thimbles 30 in an array of guide thimbles, as shown in FIG. 2 B, may receive a plug fingers 26 which itself has been loaded either with one or more capsules 10 or with one or more capsules 100. In various aspects, only one or a few of the guide thimbles 30 in an array of guide thimble need be used to house the plug fingers 26 with capsules 10 or 100.

Following irradiation, the capsules 10/100 and plug fingers 26 must be removed from the guide thimbles 30. The guide thimbles would be withdrawn from the fuel assembly 46 by known means. The mid-section 34 of a withdrawn guide thimble 30 may opened, for example, by removing either or both of the tip 34 and the neck 38. The plug finger or fingers 26 would be removed from the guide thimbles 30 and the capsules 10 and 100 would be removed from the plug fingers 26 and transported to a radioisotope production facility. In one aspect, the capsules 10/100 may be harvested from the plug fingers 26 by cutting the fingers 26 into appropriate length to fit into a transport container. Upon arrival at a production facility, the irradiated target material will be removed from the capsule and the desired radioisotope will be separated by known techniques from the irradiated material.

Figure 5:
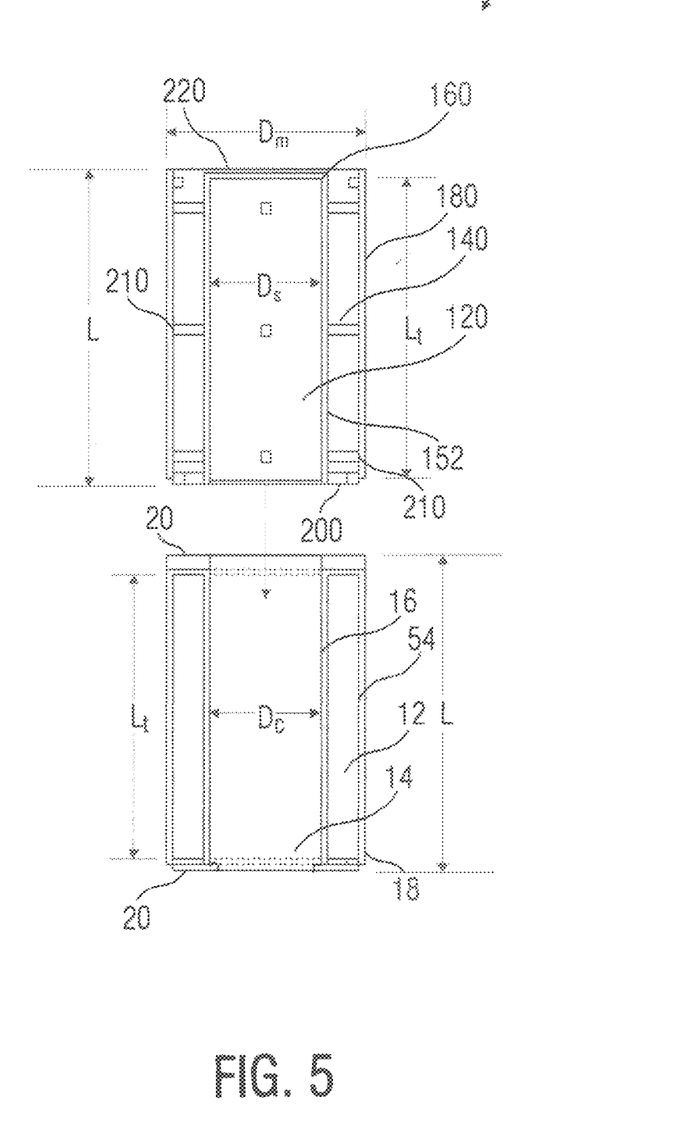
FIG. 5 is a schematic illustration of the target material of a capsule shown in FIG. 4 being inserted into the moderator-filled core of the capsule of FIG. 3.

FIG. 5 illustrates an exemplary method that can be used to increase the activity contained within the module shown on FIG. 3. The method involves irradiating (e.g., simultaneously or sequentially) modules like those shown in FIGS. 3 and 4 in the same reactor or in different reactor cores. Once the levels of the desired radioisotope have reached the desired activity levels and have been shipped to the processing facility, the linked capsule 10 or 100 modules may be uncoupled to produce individual modules. The contents of cylinders 152, for example of capsule 100 contained in the modules shown in FIG. 4 may be pushed out of the center of the module and into cylinder 52 of the module of capsule 10 shown in FIG. 3. The diameter of the inner cylinder 152 in this procedure will be smaller than the diameter of inner cylinder 52. The material that is received in cylinder 52 will be prevented from passing completely through the bottom of the cylinder 52 by the rims and locking rings 20 around the bottom of cylinder 52. This will increase the net activity and activity per unit length of the annular cylinder 54 irradiation capsule 10 module to essentially be the sum of the activity of both the capsule 10 and 100. This approach may be used to construct tubular irradiation sources with user defined axial source strength distributions that may be needed to maximize the end user desired radiation dose distribution.

While the capsules 10 and 100 have been described as having inner cylinders and annular outer cylinders, other shapes may be used. Cylinders fit best with existing fuel assembly insert components but the concept described of a container housing a target material for irradiation adjacent to (for example, either surrounded by or positioned within) a container of a neutron moderator, both housed in a capsule that can be inserted into insert components for a nuclear fuel assembly so that radiation from the nuclear reactor can be absorbed by the target material to produce a desired radioisotope is not limited to cylinders and may vary depending on the geometry of the reactor components.

The modular capsule 10/100 designs and associated methods allow the maximum amount of desired radioisotope production with the minimal disruption in fuel assembly power distribution and minimal detrimental fuel assembly enrichment impacts. The methods and capsule designs described herein allow desired radioisotopes to be produced within an existing fuel assembly using existing guide thimble insert designs.

The modular radioisotope production capsules 10/100 described herein allow the neutron energy spectrum to be optimized for the target capture cross section and the minimum reactor fuel assembly reactivity reduction with the capability to adjust the total activity contained in a module outer envelope.

While the modular capsules 10/100 have been described as being inserted into guide thimbles 30, they may in addition, or alternatively, be installed into other existing fuel assembly inserts, such as wet annular burnable absorber assemblies. The modular capsule 10/100 designs provide the radioisotope product supplier with a significant increase in product flexibility in terms of source activity levels and the distribution of activity levels within a source assembly.

Various aspects of the subject matter described herein are set out in the following examples.

Example 1—A radioisotope production capsule comprising: an inner container for housing one of a target material and a neutron moderator; an outer container surrounding the inner container for housing the one of the target material and the neutron moderator not housed by the inner container; and, cladding for isolating the target material from the neutron moderator.

Example 2—The capsule recited in Example 1, wherein the inner container is defined by an inner wall of a cladding material.

Example 3—The capsule recited in any of Examples 1 or 2, wherein the outer container is defined between an outer wall of the cladding material and the inner wall of the cladding material.

Example 4—The capsule recited in any of Examples 1-3, further comprising locking members for axially joining adjacent capsules.

Example 5—The capsule recited in Example 4, wherein the locking members are mounted on the outer container.

Example 6—The capsule recited in any of Examples 4 or 5, wherein the locking members are quick-disconnect locking members.

Example 7—The capsule recited in any of Examples 1-6, further comprising support members for holding the inner container in a desired position within the outer container.

Example 8—The capsule recited in Example 7, wherein the support members are posts that extend from an outer wall of the cladding material that forms the outer container to an inner wall of a cladding material that defines the inner container.

Example 9—The capsule recited in any of Examples 7 or 8, wherein the posts are made of a material that expands at temperatures within a nuclear reactor to provide a pressure fit for the posts between the outer wall of the outer container and the inner wall of the inner container and contracts when the material is cooled to a temperature lower than the temperatures within a nuclear reactor.

Example 10—The capsule recited in any of Examples 7-9, wherein the desired position of the inner container is axially centered within the outer container.

Example 11—The capsule recited in any of Examples 1-10, wherein the inner container is a cylinder and the outer container is an annular cylinder concentric with the axis of the inner container.

Example 12—The capsule recited in Example 11, wherein the inner cylinder holds the neutron moderator and the annular cylinder holds the target material for irradiation.

Example 13—The capsule recited in Example 11, wherein the inner cylinder holds the target material for irradiation and the annular cylinder holds the neutron moderator.

Example 14—A method for producing a desired radioisotope comprising: providing at least one capsule, each capsule having an inner container and an outer container surrounding the inner container and a cladding material isolating the inner container from the outer container; inserting a target material that will produce the desired radioisotope upon irradiation into one of the inner or the outer container; surrounding the target material with the cladding material to isolate the target material within the capsule; inserting a neutron moderator into the one of the remaining inner or outer container in which the target material was not inserted; inserting at least one capsule having target material and neutron moderator-filled inner and outer containers into an insert component of a nuclear fuel assembly; irradiating the target material to form the radioisotope for such target material; and, removing the capsule from the insert component.

Example 15—The method recited in claim 14, further comprising: removing the irradiated target material from the capsule and separating the desired radioisotope from the irradiated material.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A radioisotope production assembly, comprising:
a plug finger that is insertable into a guide thimble of a nuclear reactor, wherein the plug finger comprises at least one hole configured to allow coolant from the nuclear reactor to enter and exit the plug finger; and
a capsule configured to be positioned within the plug finger, the capsule comprising:
an inner cladding;
an outer cladding;
an inner container defined by the inner cladding, wherein the inner container is for housing one of a target material and coolant from the nuclear reactor;
an outer container defined by the inner cladding and the outer cladding, wherein the outer container surrounds the inner container and is for housing the one of the target material and coolant not housed by the inner container; and
an opening to allow the coolant from the nuclear reactor that has entered the plug finger to enter the inner container or the outer container that is for housing the coolant.

2. The radioisotope production assembly of claim 1, wherein the plug finger comprises an outer sheath and a tapered closed end.

3. The radioisotope production assembly recited in claim 1, wherein the inner container is a cylinder and the outer container is an annular cylinder concentric with the axis of the inner container.

4. The radioisotope production assembly recited in claim 3, wherein the inner cylinder is for housing the coolant and the annular cylinder is for housing the target material for irradiation.

5. The radioisotope production assembly recited in claim 3, wherein the inner cylinder is for housing the target material for irradiation and the annular cylinder is for housing the coolant.

6. The radioisotope production assembly recited in claim 3, wherein the capsule comprises a first capsule, wherein the radioisotope production assembly further comprising a second capsule axially adjacent to the first capsule, and wherein the first capsule comprises locking members for axially joining the first capsule to the second capsule.

7. The radioisotope production assembly recited in claim 6, wherein the locking members are mounted on the outer container of the first capsule.

8. The radioisotope production assembly recited in claim 6, wherein the locking members are quick-disconnect locking members.

9. The radioisotope production assembly recited in claim 6, wherein the opening is a first opening is at a first end of the first capsule, wherein the first capsule comprises a second opening at a second end of the first capsule, wherein the second capsule is axially adjacent to the second end of the first capsule, and wherein the second opening is configured to allow the coolant to flow into a container of the second capsule.

10. The radioisotope production assembly recited in claim 1, further comprising support members for holding the inner container in a desired position within the outer container.

11. The radioisotope production assembly recited in claim 10, wherein the support members are posts that extend from the inner wall of the outer cladding to the outer wall of the inner cladding.

12. The radioisotope production assembly recited in claim 11, wherein the posts are made of a material that expands at temperatures within the nuclear reactor to provide a pressure fit for the posts between the inner wall of the outer cladding and the outer wall of the inner cladding and contracts when the material is cooled to a temperature lower than the temperatures within the nuclear reactor.

13. The radioisotope production assembly recited in claim 10, wherein the desired position of the inner container is centered within the outer container.

14. A radioisotope production assembly, comprising:
a plug finger configured to be inserted into a guide thimble of a nuclear reactor, wherein the plug finger defines an axis, and wherein the plug finger comprises holes configured to allow coolant from the nuclear reactor to enter and exit the plug finger; and
a plurality of capsules configured to be positioned within the plug finger in an axially-stacked arrangement, wherein the plurality of capsules comprise locks for joining axially-adjacent capsules, and wherein each of the plurality of capsules comprises:
an inner cladding;
an outer cladding;
an inner container defined by the inner cladding, wherein the inner container is for housing one of a target material and coolant from the nuclear reactor;
an outer container defined by the inner cladding and the outer cladding, wherein the outer container surrounds the inner container and is for housing the one of the target material and coolant not housed by the inner container, wherein the inner container or the outer container that is for housing the coolant comprises open ends configured to allow the coolant from the nuclear reactor that has entered the plug finger to enter the inner container or the outer container that is for housing the coolant.

* * * * *